United States Patent
Umemura et al.

(10) Patent No.: US 7,269,946 B2
(45) Date of Patent: Sep. 18, 2007

(54) HST DRIVE CIRCUIT

(75) Inventors: Tetsuo Umemura, Tokyo (JP); Isao Konishi, Tokyo (JP); Hideo Shimazaki, Tokyo (JP)

(73) Assignee: Shin Caterpillar Mitsubishi, Tokyo (JP)

( * ) Notice: Subject to any disclaimer, the term of this patent is extended or adjusted under 35 U.S.C. 154(b) by 187 days.

(21) Appl. No.: 10/529,489

(22) PCT Filed: Apr. 27, 2004

(86) PCT No.: PCT/JP2004/006109
§ 371 (c)(1),
(2), (4) Date: Jun. 7, 2005

(87) PCT Pub. No.: WO2005/015062
PCT Pub. Date: Feb. 17, 2005

(65) Prior Publication Data
US 2006/0048509 A1   Mar. 9, 2006

(30) Foreign Application Priority Data
Aug. 7, 2003   (JP) ............................. 2003-289004

(51) Int. Cl.
*F16D 31/02* (2006.01)
(52) U.S. Cl. .......................................... 60/456; 60/487
(58) Field of Classification Search ................. 60/456, 60/487
See application file for complete search history.

(56) References Cited
U.S. PATENT DOCUMENTS

| | | | | |
|---|---|---|---|---|
| 2,961,829 A | * | 11/1960 | Weisenbach | 60/464 |
| 3,230,699 A | * | 1/1966 | Hann et al. | 60/444 |
| 3,236,049 A | * | 2/1966 | Reinke | 60/444 |
| 3,585,797 A | * | 6/1971 | Moon, Jr. | 60/444 |
| 4,617,797 A | * | 10/1986 | Williams | 60/444 |
| 4,802,336 A | * | 2/1989 | Mayr et al. | 60/448 |
| 5,265,422 A | * | 11/1993 | Watts | 60/488 |
| 5,746,509 A | * | 5/1998 | Gebhard et al. | 60/464 |
| 6,964,163 B2 | * | 11/2005 | Landhuis | 60/464 |

FOREIGN PATENT DOCUMENTS

| | | |
|---|---|---|
| JP | A 11-30304 | 2/1999 |
| JP | A 2001-146951 | 5/2001 |
| JP | A 2002-227998 | 8/2002 |
| JP | A 2003-14112 | 1/2003 |

OTHER PUBLICATIONS

Sauer-Danfoss, Series 20 Axial Piston Pumps, Technical information, 520L0517, Feb. 2002.*

* cited by examiner

*Primary Examiner*—Igor Kershteyn
(74) *Attorney, Agent, or Firm*—Oliff & Berridge, PLC

(57) ABSTRACT

The present invention makes it possible, in an HST drive circuit wherein an HST pump and an HST motor have been separately stored in a pump case and a motor case, to efficiently cool the HST drive circuit. A cooling line for, while discharging a relief oil from a charge circuit 9 for replenishing an HST closed circuit 5 with a pressure oil into a pump case 3, making the discharged oil flow into a reservoir 7 through the pump case 3, a communicating pipe 14, a motor case 4, and an oil cooler 16 is formed, so that hydraulic oil circulating through an HST pump 1, an HST motor 2, and the HST closed circuit 5 is cooled by an oil flowing through the cooling line.

1 Claim, 1 Drawing Sheet

HST DRIVE CIRCUIT

TECHNICAL FIELD OF THE INVENTION

The present invention relates to the technical field of an HST drive circuit provided in a construction machine such as a wheel loader and an agricultural machine such as a tractor.

BACKGROUND OF THE INVENTION

Generally, in a construction machine such as a wheel loader and an agricultural machine such as a tractor, an HST drive circuit can be used as a power transmission mechanism to a travel device, and therein, in some cases, a hydraulic pump (HST pump) and a hydraulic motor (HST motor) are stored in one case, and in some cases, these are separately stored in a pump case and a motor case.

Meanwhile, in the HST drive circuit, because hydraulic fluid circulates in the closed circuit between the HST pump and HST motor, it is desirable to provide a cooling function to suppress a rise in temperature of the circulating hydraulic fluid. Therefore, a conventional structure that an oil cooler is arranged at an upstream side of a charge circuit (replenishing circuit) for replenishing an HST closed circuit with fluid (see Japanese Published Unexamined Patent Application No. H6-3720, for example) has been known.

However, in the HST drive circuit, normally, pressure fluid of the charge circuit is to be introduced into variable displacement units of the HST pump and HST motor so as to operate the variable displacement units. Accordingly, as in the above-described patent document, if an oil cooler is arranged at an upstream side of the charge circuit, in, for example, a case such as starting in winter, there is a concern that the fluid temperature of the charge circuit is excessively lowered to heighten oil viscosity, thus starting the variable displacement units becomes difficult. Furthermore, as described above, in an HST drive circuit wherein the HST pump and HST motor have been separately stored in a pump case and a motor case, it is necessary to sufficiently cool both, therein exists a problem to be solved by the present invention.

DISCLOSURE OF INVENTION

In view of the circumstances as described above, the present invention has been created for the purpose of solving these problems, and an invention according to claim 1 is, in an HST drive circuit formed by connecting a hydraulic pump stored in a pump case and a hydraulic motor stored in a motor case in a closed circuit form, characterized in that a cooling line for, while discharging a relief oil from a charge circuit for replenishing the closed circuit with a pressure oil into the pump case, making the discharged oil flow into an oil tank, from the pump case, through the motor case, to an oil cooler is formed.

By providing the invention according to claim 1, it becomes possible to efficiently cool the HST drive circuit by the oil flowing through the cooling line leading to the reservoir through the pump case, motor case, and oil cooler, from the charge circuit, a rise in temperature of the hydraulic fluid circulating through the closed circuit can be securely suppressed. In particular, by guiding the total quantity of oil discharged from the pump case to the motor case, an excessive rise in temperature inside the motor case can be effectively suppressed. Moreover, as in the art wherein an oil cooler has been arranged at an upstream side of a charge circuit, the concern that starting the capacity variable units of the HST pump and HST motor becomes difficult can also be avoided.

BEST MODE FOR CARRYING OUT THE INVENTION

Figure 1:
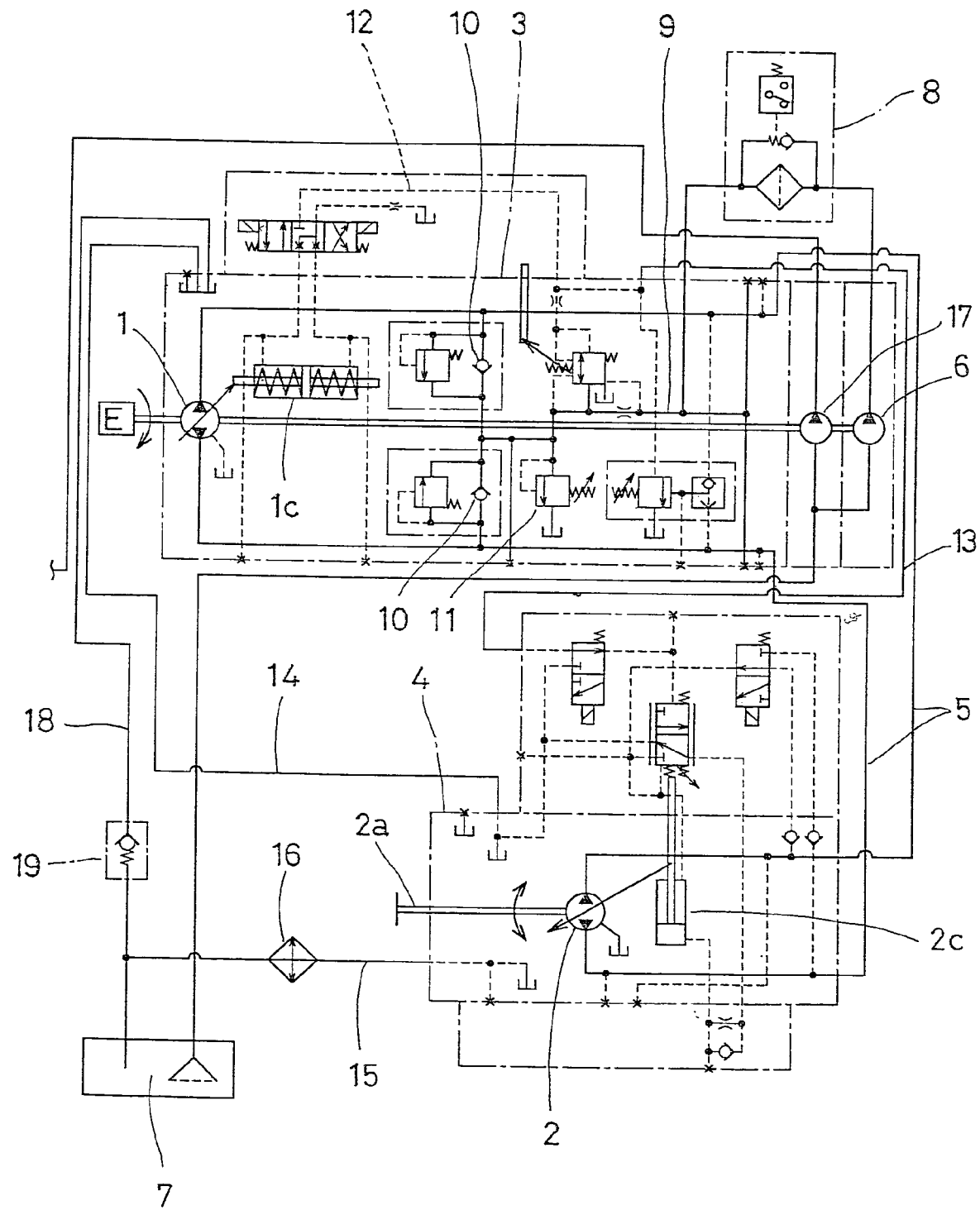
FIG. 1 is an HST drive circuit diagram.

Next, an embodiment of the present invention will be described based on the drawing. In FIG. 1, a travelling HST drive circuit provided in a wheel loader is shown, and in this FIG. 1, 1 denotes a hydraulic pump of a variable displacement type (hereinafter, referred to as an HST pump 1) rotated by a drive of an engine E, 2 denotes a hydraulic motor of a variable displacement type (hereinafter, referred to as an HST motor 2) for causing an output shaft 2a interlocked and coupled with a travel device of the wheel loader to rotate, and the HST pump 1 and HST motor 2 are separately stored in a pump case 3 and a motor case 4, respectively, and are connected via an HST closed circuit 5, so that hydraulic fluid circulates between the HST pump 1 and HST motor 2.

In addition, 6 denotes a charge pump rotated by an engine drive, and this charge pump 6 supplies oil suctioned from a reservoir 7, through a filter 8, to a charge circuit 9 formed inside a pump case 3. The charge circuit 9 is connected to an HST closed circuit 5 via a check valve 10, and replenishes the HST closed circuit 5 with oil by a leaked amount. A circuit pressure of this charge circuit 9 is determined by a charge relief valve 11 incorporated in the pump case 3 and a relief oil from this charge relief valve 11 is to be discharged into the pump case 3. Furthermore, pressure oil of the charge circuit 9 is to be introduced through control pilot circuits 12, 13 into variable displacement units 1c, 2c of the HST pump 1 and HST motor 2 so as to operate these variable displacement units 1c, 2c.

On the other hand, the pump case 3 and motor case 4 are connected so that the case interiors are communicated with each other via a communicating pipe 14. Furthermore, 15 denotes a discharging oil channel leading to the reservoir 7 from the motor case 4, and an oil cooler 16 is arranged in this discharging oil channel 15.

And, as described above, a relief oil from the charge relief valve 11 is discharged into the pump case 3, wherein the discharged oil lubricates and cools the inside of the pump case 3 and furthermore flows into the motor case 4 via the communicating pipe 14 to lubricate and cool the inside of the motor case 4. Thereafter, the discharged oil passes through the discharging oil channel 15 and returns to the reservoir 7 after being cooled by the oil cooler 16, thus a cooling line in a serial form flowing into the reservoir 7 from the charge pump 6, through the pump case 3 and motor case 4, to the oil cooler 16 is formed.

Here, in FIG. 1, 17 denotes a main pump rotated by an engine drive, and this main pump 17 is structured so as to become a hydraulic pressure supplying source of a steering drive unit and an operating machine drive unit of the wheel loader (neither of these is shown).

Furthermore, 18 denotes a bypass line leading to the reservoir 7 from the pump case 3, and in this bypass line 18, arranged is a bypass valve 19 which opens when pressure of the bypass line 18 becomes a preset set pressure or more. And, when oil viscosity is heightened during a time of low temperature such as in winter, the bypass valve 19 opens to let the oil flow into the reservoir 7 from the upstream side of the cooling line, whereby it becomes possible to effectively prevent the pressure of the whole cooling line from becoming excessively great. In addition, when the bypass valve 19 opens, the oil flowed out of the pump case 3 and motor case 4 is to flow into the reservoir 7 without passing through the oil cooler 16, therein an effect exists such that, during a time of low temperature such as in winter, oil temperature can be efficiently raised to a temperature suitable for operating hydraulic equipment.

In the present embodiment structured as has been described, in the HST drive circuit, a cooling line for making a relief oil discharged into the pump case 3 via the charge relief valve 11 from the charge pump 6 flow into the oil tank 7 through the communicating pipe, motor case 4, and oil cooler 16 has been formed, and by an oil flowing through this cooling line, hydraulic oil circulating through the HST pump 1, HST motor 2, and HST closed circuit 5 is cooled.

As a result, even when the HST pump 1 and HST motor 2 are stored in the separate pump case 3 and motor case 4, respectively, the hydraulic oil circulating through the HST pump 1, HST motor 2, and HST closed circuit 5 can be efficiently cooled by the oil flowing through the cooling line, therefore, even if the HST drive circuit is continuously driven for a long time, a rise in temperature of the hydraulic fluid can be securely suppressed. In particular, because the total quantity of oil which flows out of the pump case 3 is to be guided to the motor case 4, this is effective for suppressing a rise in temperature inside the motor case 4. Moreover, as in the prior art wherein an oil cooler has been arranged at an upstream side of a charge circuit, the concern that starting the variable displacement units 1*c*, 2*c* of the HST pump 1 and HST motor 2 becomes difficult can also be avoided.

Here, as a matter of course, the present invention can be employed not only in HST drive circuits for travelling wheel loaders but also in various HST drive circuits for construction machines other than wheel loaders and agriculture machines such as tractors, etc.

INDUSTRIAL APPLICABILITY

As in the above, an HST drive circuit according to the present invention is useful as various HST drive circuits for construction machines such as wheel loaders and agriculture machines such as tractors, etc., and is suitable, in particular, for such a case where the HST drive circuit is continuously driven for a long time.

What is claimed is:

1. An HST drive circuit comprising:
   a hydraulic pump stored in a pump case;
   a hydraulic motor stored in a motor case;
   the hydraulic pump and the hydraulic motor connected to each other to form a closed circuit;
   a charge circuit for replenishing the closed circuit with hydraulic fluid;
   a charge pump providing the hydraulic fluid to the charge circuit;
   a charge relief valve setting a pressure of the charge circuit;
   an oil cooler provided in an oil passage reaching a reservoir from the motor case; and
   a cooling line for cooling the pump case and the motor case;
   wherein a relief oil from a charge relief valve is charged to the pump case and the cooling line makes the oil, which has been discharged from the charge pump through the charge relief valve to the pump case, flow to the reservoir via the pump case and the motor case.

* * * * *